United States Patent
Hernandez

(10) Patent No.: US 10,843,978 B1
(45) Date of Patent: Nov. 24, 2020

(54) MATERIALS AND METHODS FOR AGRICULTURAL USE

(71) Applicant: Ag Infusion Intl. LLC, Las Vegas, NV (US)

(72) Inventor: Valena Angela Hernandez, Tujunga, CA (US)

(73) Assignee: Ag Infusion Intl. LLC, Las Vegas, NV (US)

( * ) Notice: Subject to any disclaimer, the term of this patent is extended or adjusted under 35 U.S.C. 154(b) by 0 days.

(21) Appl. No.: 14/829,586

(22) Filed: Aug. 18, 2015

Related U.S. Application Data

(60) Provisional application No. 62/038,454, filed on Aug. 18, 2014.

(51) Int. Cl.

| | |
|---|---|
| *C05B 17/00* | (2006.01) |
| *A01N 65/28* | (2009.01) |
| *A01N 49/00* | (2006.01) |
| *A01N 25/02* | (2006.01) |
| *C05G 3/60* | (2020.01) |
| *C05G 5/23* | (2020.01) |
| *A01N 65/03* | (2009.01) |
| *A01N 59/06* | (2006.01) |

(52) U.S. Cl.
CPC .............. *C05B 17/00* (2013.01); *A01N 25/02* (2013.01); *A01N 49/00* (2013.01); *A01N 59/06* (2013.01); *A01N 65/03* (2013.01); *A01N 65/28* (2013.01); *C05G 3/60* (2020.02); *C05G 5/23* (2020.02)

(58) Field of Classification Search
CPC ........ C05B 17/00; A01N 25/02; A01N 65/28; A01N 49/00; A01N 65/03; A01N 59/06; C05G 3/02; C05G 3/0076; C05G 5/23; C05G 3/60
See application file for complete search history.

(56) References Cited

U.S. PATENT DOCUMENTS

| | | | | |
|---|---|---|---|---|
| 6,083,293 | A | * | 7/2000 | Bath .......... C05C 9/00 71/16 |
| 6,159,262 | A | * | 12/2000 | Tumbers .......... C05F 3/00 71/11 |
| 7,018,641 | B1 | | 3/2006 | Momol et al. |
| 8,568,800 | B2 | | 10/2013 | Tumbers |
| 2007/0237837 | A1 | * | 10/2007 | Pipko ............ A61K 31/19 424/717 |

OTHER PUBLICATIONS

Ecolandcare Tea Compost Components. [online]. Ecolandcare, 2013 [retrieved on Sep. 5, 2016]. Retrieved from the Internet:<http://www.ecolandcare.com/Ecolandcare%20Tea%20Compost%20Components_2013_01_13_00_29_18_867.pdf> p. 1.*

Boyan, G.E., et al., Evaluation of Growth Stimulants on Short-Day Onions, 2001, HortTechnology, vol. 11, No. 1, pp. 38-42.*

Tropicals & Tender Perennials:2009 Recipe. Blog. [online]. Daves Garden, 2009, [retrieved on Jun. 2, 2017]. Retrieved from the Internet:<URL: http://davesgarden.com/community/forums/t/956114/>, 9 pages.*

Humate Tea. [online]. Watson Rance Organinc Fertilizers and Soil Amendments, 2011, [retrieved on Jun. 5, 2017]. Retrieved from the Internet<URL:https://web.archive.org/web/20110410080443/http://www.watsonranchorganic.com/HumateTea.html> 2 pages.*

Calvo et al., "Agricultural uses of plant biostimulants," *Plant Soil*, 383:3-41, 2014.

Cwalina-Ambroziak, "The Effect of Foliar Fertilizers on Mycelial Growth of Select Pathogenic Fungi under in vitro Conditions," *Pol. J. Environ. Stud.*, 21(3):589-594, 2012.

Kuepper, "Foliar Fertilization," *ATTRA* Publication #CT13, 10 pages, 2003.

Morgan, "Hydroponic Foliar Fertilization," *Maximum Yield Magazine*, Article 4-4 (3 pages), accessible online at simplyhydro.com/foliar_feeding.htm; downloaded Mar. 25, 2015.

TMIN-Aid, "Organic Solutions for World Health," *Ag Infusion INTL. LLC*, Las Vegas, NV, available on the World Wide Web at: aginfusion.com/wp-content/uploads/2015/04/Tmin-Aid-Flyer.pdf , 2 pages.

* cited by examiner

*Primary Examiner* — John Pak
*Assistant Examiner* — Andriae M Holt
(74) *Attorney, Agent, or Firm* — Klarquist Sparkman, LLP

(57) ABSTRACT

Described herein are biofertilizer compositions that rely on a natural oil extract of Tea Tree (*Melaleuca alternifolia*) (TTO) where the macronutrient components in the composition contribute to the fertilizer mixture, particularly as a foliar fertilizer mixture. The compositions include both TTO macronutrients (NPK) and terpenes.

3 Claims, 3 Drawing Sheets

MATERIALS AND METHODS FOR AGRICULTURAL USE

CROSS REFERENCE TO RELATED APPLICATION

This application claims the benefit of U.S. Provisional Application No. 62/038,454, filed Aug. 18, 2014, which is herein incorporated by reference in its entirety.

BACKGROUND

Fungicides are proficient in reducing the severity of fungal diseases, but due to their adversarial environmental effects, are increasingly being replaced with plant extracts and/or biocontrol agents. Organic fertilizers, in particular foliar fertilizers are a viable alternative to fungicides. Fertilizers supply a mandated measurement of derived macronutrients Nitrogen (N), Phosphorus (P) and Potassium (K) and may provide macronutrients Mg, Ca and S and micronutrients (Fe, Mn, Cu, Zn, B, Mo). Fertilizer bags are labeled with at least three numbers. These numbers list the percentage of nitrogen (N), available phosphate (as $P_2O_5$) and soluble potash (as $K_2O$). These numbers represent nitrogen, phosphorous and potassium, commonly referred to as N—P—K.

Compared to synthetic fertilizer formulations, natural organic fertilizers contain relatively low concentrations of actual nutrients, but they perform other important functions which synthetic formulations do not. These functions include increasing organic matter content of the soil, improving physical structure of the soil and increasing bacterial and fungal activity, particularly the mycorrhizal fungi which alone make other nutrients more available to plants.

Leaves have transcuticular pores (i.e. pores between cell structures) and stomata through which nutrient sprays can enter the plant. The transcuticular pores on both the upper and lower surfaces of leaves allow foliar-applied nutrients to have primary entry through these pores. Foliar applications can have important secondary benefits. When nutrients are provided to foliage it causes the plants to exude more sugars and other compounds into the root zone. This increases microbial activity around the root zone, which in turn enhances the uptake of nutrients by the plant from the soil.

Tea tree oil- (TTO)-containing compositions may act as pesticides, biocides, and bio fungicides or herbicidal in nature. Terpenoids and plant extracts have sometimes been used in pesticide applications to agricultural structures associated with livestock and grain storage facilities (e.g., U.S. Pat. No. 8,568,800). *Melaleuca alternifolia* essential oil has been used in conjunction with ethyl alcohol and detergent as fumigant control agents in soil application effective against soil-borne fungi (e.g., U.S. Pat. No. 7,018,641). *Melaleuca alternifolia* essential oil has also been used with other components to form a non-phytotoxic biocide (e.g., U.S. Publication. No. 2007/0237837A1).

SUMMARY

It is believed that no prior compositions have relied on tea tree oil (TTO) to provide plant nutrients (e.g., NPK), nor has TTO been used in combinations for the enhancement of organic soil matter as derived for fertilizer application. The subject invention takes advantage of previously unappreciated properties of TTO and active biocontrol interference with plant pathogens. Various embodiments furthermore enhance these TTO properties with microbial stimulants.

Provided herein are cost-effective water soluble fertilizer compositions comprising of TTO, liquid macronutrients and micronutrients derived from natural organic sources.

Several foliar uptake studies have presented results which show an improved efficacy of formulations when containing adjuvants that serve to enhance the retention properties of foliar sprays as compared to pure mineral compositions. This invention operates on that premise and recognizes TTO as an adjuvant which can have a significant effect on the uptake and bioactivity of the nutrients supplied to the foliage. It is also recognized TTO may also increase the phytotoxicity risk associated with the nutrient active ingredients applied. As such, the subject invention compounds and their relative concentration which is necessary to develop a foliar nutrient formulation that provides reproducible plant uptake responses without plant damage is within the scope of this invention.

A significant commercial justification for the use of foliar fertilizers is based upon the premise that they offer a specific advantage over soil fertilizers at certain crop phenological stages associated with Biotic and Abiotic stress 'events'. Conventional rationales for foliar fertilizer application includes: 1) when soil conditions limit availability of soil applied nutrients; 2) in conditions when high loss rates of soil applied nutrients may occur; 3) and/or when the stage of plant growth, the internal plant demand and the environment conditions interact to limit delivery of nutrients to critical plant organs. In each of these conditions, the decision to apply foliar fertilizers is determined by the magnitude of the financial risk associated with the failure to correct a deficiency of a nutrient and the perceived likelihood of the efficacy of the foliar fertilization.

The foregoing and other features and advantages will become more apparent from the following detailed description of several embodiments, which proceeds with reference to the accompanying figures.

DETAILED DESCRIPTION

I. Abbreviations

Figure 1:
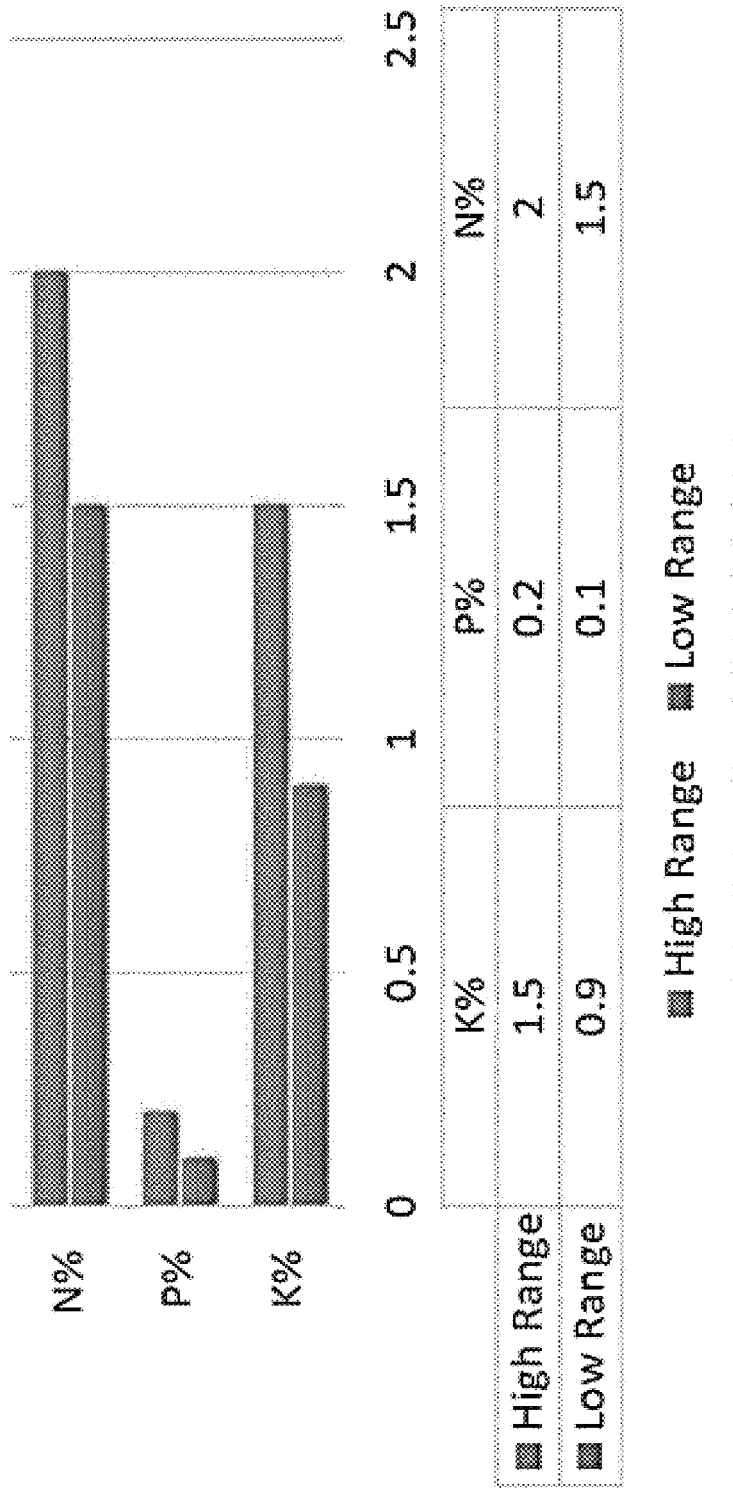
FIG. 1 is a diagram depicting Tea Tree '*Leaf Tissue Nutrient Levels*'.

NPK nitrogen-phosphorus-potassium
TTO Tea tree oil

II. Terms

Unless otherwise noted, technical terms are used according to conventional usage. Definitions of common terms in molecular biology may be found in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.),

*Molecular Biology and Biotechnology: a Comprehensive Desk Reference*, published by VCH Publishers, Inc., 1995 (ISBN 1-56081-569-8).

In order to facilitate review of the various embodiments of the invention, the following explanations of specific terms are provided:

Agricultural biostimulants are a broad category of natural substances that are applied to soil and plants to improve and regulate the crop's biological and/or physiological processes, for instance by stimulating plant growth to improve crop yields, vigor, and quality. Generally, agricultural biostimulants include: acid-based biostimulants (e.g., humic acid, fulvic acid, and amino acids), which are the largest share of the current commercial market; extract-based biostimulants (such as seaweed or plant extracts); and miscellaneous other compounds (e.g., B-vitamins; chitin, chitosan, and related compounds; and microbes). Acid-based biostimulants are made from relatively readily available raw materials; they are generally more efficiently produced compared to extract-based biostimulants. See, e.g., "Biostimulants Market by Active Ingredient (Acid-Based & Extract Based), by Application Type (Foliar, Soil, & Seed), by Crop Type (Row Crops, Fruits & Vegetables, and Turf & Ornamentals) & by Region—Global Trends & Forecasts to 2019" by: marketsandmarkets.com, published November 2014 (Report Code: AGI 2920).

Unless otherwise explained, all technical and scientific terms used herein have the same meaning as commonly understood by one of ordinary skill in the art to which this invention belongs. The singular terms "a," "an," and "the" include plural referents unless context clearly indicates otherwise. Similarly, the word "or" is intended to include "and" unless the context clearly indicates otherwise. Hence "comprising A or B" means including A, or B, or A and B. It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

III. Description of Various Embodiments

A first embodiment provides cost-effective water soluble fertilizer compositions comprising of TTO, liquid macronutrients and micronutrients derived from natural organic sources. Representative proportions of the components in these compositions are provided below.

Several foliar uptake studies have presented results which show an improved efficacy of formulations when containing adjuvants that serve to enhance the retention properties of foliar sprays as compared to pure mineral compositions. The inventor has recognized TTO as an adjuvant which can have a significant positive effect on the uptake and bioactivity of nutrients supplied to plant foliage. TTO may also increase the phytotoxicity risk associated with nutrient active ingredients applied to the foliage; thus, the subject invention compounds and their relative concentration which is necessary to develop a foliar nutrient formulation that provides reproducible plant uptake responses without plant damage is within the scope of this invention. For instance, the percentage of TTO may be reduced with an increase in *Ascophyllum nodosum.*

A significant commercial justification for the use of foliar fertilizers is based upon the premise that they offer a specific advantage over soil fertilizers at certain crop phenological stages associated with Biotic and Abiotic stress 'events'. Conventional rationales for foliar fertilizer application includes: 1) when soil conditions limit availability of soil applied nutrients; 2) in conditions when high loss rates of soil applied nutrients may occur; 3) and/or when the stage of plant growth, the internal plant demand and the environment conditions interact to limit delivery of nutrients to critical plant organs. In each of these conditions, the decision to apply foliar fertilizers is determined by the magnitude of the financial risk associated with the failure to correct a deficiency of a nutrient and the perceived likelihood of the efficacy of the foliar fertilization.

Foliar fertilizer applications are known to have a number of benefits, including for instance: Foliar fertilization application is readily accessible by plants for instance through stomata and absorption directly into leaf tissue; results in increased fruit set during flowering, pollination, and germination; results in increased oxygen available and $CO_2$ uptake through the leaves. Fertilization can also reduce necessary nutrient inputs, improve the degradation/recycling of plant tissue residue, provide or chelate minerals in a readily bio-available form, provide a clean carbon source for soil microbes (including microbes that are beneficial to plants, and or to increase soil aeration), worms and other burrowing animals, provide better nutrient maintenance in soil local to the plant, and encourage development of healthy soil solutions.

The subject invention is a method comprised of applying a fertilizer composition to surfaces for treatment of Biotic and Abiotic stresses.

Embodiments provided herein comprise water soluble TTO-derived NPK and antimicrobial terpenes (such as terpinen-4-ol, γ-terpinene, and/or 1.8-cineole—provided separately or as tea tree oil) compositions added to water-soluble compounds derived from *Ascophyllum nodosum* (kelp) and natural organic microbial biostimulants.

A distinction between foliar fertilization uptake may occur in the application of soluble nutrients where the majority of the nutrients taken up by plants are absorbed by the roots from the soil. When liquid fertilizer is sprayed on foliage, some nutrients are absorbed through the leaves and light, frequent applications are seen to constitute true foliar fertilization. With heavier spraying there is likely to be considerable runoff from the foliage and the liquid fertilizer will saturate the soil. In this case, there is some nutrient absorption through leaves, but it is likely that the majority of the nutrients used by the plant would actually be taken up by roots—through essentially the same process that occurs when fertilizer is added to the soil. Thus, it is further understood that application to the soil is also a feasible alternative.

The subject invention products are suitable for application by conventional foliar spray methods. Specific formulations which can be used according to the subject invention as folia fertilizer for field application include the following:

Formula 1:

TTO range of 20% to 25%

*Ascophyllum nodosum* preparation range of 10% to 15% natural organic derived microbial biostimulants 3% to 5% natural organic derived minerals range of 40% to 50%, and water 50% to 70% (to make up the remaining volume).

Formula 2:
  TTO range of 15% to 20
  *Ascophyllum nodosum* preparation range of 15% to 20%
  natural organic derived microbial biostimulants 1% to 3%
  natural organic derived minerals range of 30% to 40%, and
  water to make up the remaining volume.

Formula 3:
  TTO range of 10% to 15%
  *Ascophyllum nodosum* preparation range of 30% to 35%
  natural organic derived microbial biostimulants 7% to 9%
  natural organic derived minerals range of 30% to 35%, and
  water to make up the remaining volume.

Formula 4:
  TTO range of 5% to 10%
  *Ascophyllum nodosum* preparation range of 25% to 30%
  natural organic derived microbial biostimulants 5% to 7%
  natural organic derived minerals range of 25% to 30%, and
  water to make up the remaining volume.

Formula 5:
  TTO range of 5% to 25%
  *Ascophyllum nodosum* preparation range of 4% to 25%
  natural organic derived microbial biostimulants 1% to 5%
  natural organic derived minerals range of 10% to 50%, and
  water 10% to 73% (to make up the remaining volume).

One specific, non-limiting formulation is Formula 6: TTO ~25%, Humic Acid ~5%, mineral ~50%, and seaweed concentrate ~13%. In certain embodiments, the TTO is ISO 4730. TTO can be purchased commercially from a number of suppliers, as will be recognized by one of ordinary skill in the art.

In certain embodiments, the *Ascophyllum nodosum* is a water soluble extract of kelp, or more generally a seaweed extract or concentrate. Preferably, the extraction method yields an organic approved product. *Ascophyllum nodosum* preparations can be purchased commercially from a number of suppliers, as will be recognized by one of ordinary skill in the art.

In certain embodiments, the organic derived microbial biostimulants are acid-based and/or extract based natural derived biostimulants. These in some instances include humic acid, fulvic acid, or a mixture of both. In any particular embodiment, the proportion of humic acid to fulvic acid may be from 1 to 100, to 100 to 1, for instance. Optionally, humic acid alone may be used, or fulvic acid alone.

In certain embodiments, the organic derived minerals comprise trace minerals. Micro and macro trace mineral, including essential mineral preparations, can be purchased commercially from a number of suppliers, as will be recognized by one of ordinary skill in the art. In one non-limiting example, the mineral are provided as a liquid mineral preparation, such as SenTraMin™ Liquid Minerals (Liquid Assets, Inc., TX).

The inventors have found that use of a combination of TTO and natural organic derived NPK compounds elicit synergistic effects of microbial activity which is further enhanced by the herein composition formula and offers an increased likelihood of pathogen resistance in comparison to commercially available folia fertilizer and soil-applied fertilizer products.

Appropriate formulations and preparations can be readily ascertained by those skilled in this art using the teachings of the subject invention. This is significant as lower use rates lead to lower crop and/or environmental residue, lower application costs and an expansion of the margin between crop safety and fungicide resistance.

The subject invention incorporates several methods for the treatment of Abiotic and Biotic stress events. In one foliar application, the method involves diluting a concentrated of 1.89 liters solution (prepared, for instance, as in Formula 6) per 2000 liter of water. The diluted solution is then sprayed onto the crops with an amount necessary to saturate the foliage. The amount depends on the type of stress being treated, weather conditions and the crop.

Among the further applications of the subject invention are the following: the use of the subject invention to improve or compliment the activity of other fertilizers; as an aquaculture product and as a bio-fertilizer. Among the further forms of the subject invention are the following: powder, slow release and precise foliar applications.

The formulation is sold with a label or other instructions for use, which in most countries must be approved by a regulatory body. These instructions may instruct the end-user to dilute the formulation in a particular manner, or may instruct the end-user to use the formulation as sold. In either case, the instructions will recommend a minimum dosage to be used for each type of crop with which the formulation is to be used, for example 20 liters of the formulation per 1 hectares of crop. Alternative application rates include 2 liters of a provided TTO-containing fertilizer preparation (for instance, TMINAid™) added to 1,000 liters of water, with an application rate of approximate 1000 liters per hectare in the field. For smaller applications (e.g., household uses), a representative rate is 1 tsp of fertilizer preparation per gallon of water. Some things to consider when applying the herein provided foliar fertilizers include: application accuracy and calibration of spray equipment, droplet size applied to plants and accurate wetting of the plants so that the plants are wet but without excess run-off of the product. If too much of the foliar fertilizer is applied to the plants there is a strong possibility that the plants will display some negative outcome, for instance burning of the leaves. It is therefore recommended to test the particular plants and conditions at any grow site by applying two dilutions of the foliar fertilizer product—2 liters in 1000 liters of water and a slightly more diluted rate of around 2 liters in 1,200 liters of water.

It will be appreciated by persons skilled in the art that the present invention is not limited to what has been particularly shown and described hereinabove. Rather the scope of the present invention is defined by the general combination of parts that perform the same functions as exemplified in the embodiments, and includes both combinations and subcombinations of the various features described hereinabove as well as variations and modifications thereof, which would occur to persons skilled in the art upon reading the foregoing description.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

Methods of foliar application of compositions are well known. See, for instance, Cwalina-Ambroziak ("The Effect of Foliar Fertilizers on Mycelial Growth of Select Pathogenic Fungi under in vitro Conditions," *Pol. J. Environ. Stud.* 21(3):589-594, 2012; particularly describing foliar application and impact on plant pathogens); Kuepper ("Foliar Fertilization." NCAT Agriculture Specialist. ATTRA Publication #CT13, 2003; describing foliar application and impact on disease resistance); and Dr. Lynette Morgan ("Hydroponics Foliar Fertilizer", Maximum Yield Magazine, Article 4-4). Each of these articles is incorporated by reference herein.

The following examples are provided to illustrate certain particular features and/or embodiments. These examples should not be construed to limit the invention to the particular features or embodiments described.

EXAMPLES

Example 1: Analysis of N—P—K Content

This Example describes characterization of the macronutrient composition of pure tea tree oil compared to an embodiment of the compound fertilizer composition described herein.

Tea Tree 'Leaf Tissue Nutrient Levels' as published in 'Tea Tree: The Genus *Melaleuca*,' edited by Ian Southwell, Robert Lowe, Taylor & Francis (Pub.) 1999, indicates that 'There are few published data on tea tree leaf tissue nutrient levels'. The authors compare Tea Tree (*Melaleuca alternifolia*) NPK to other native species, and consider the environmental impact on the presence of TTO major and minor nutrients. For purposes of the subject disclosure, this published work is used as a reference for the baseline level of NPK in TTO (FIG. 1). Multiple tests were run; the high and low results are depicted, in order to provide feeling of the range of amounts.

Figure 2:
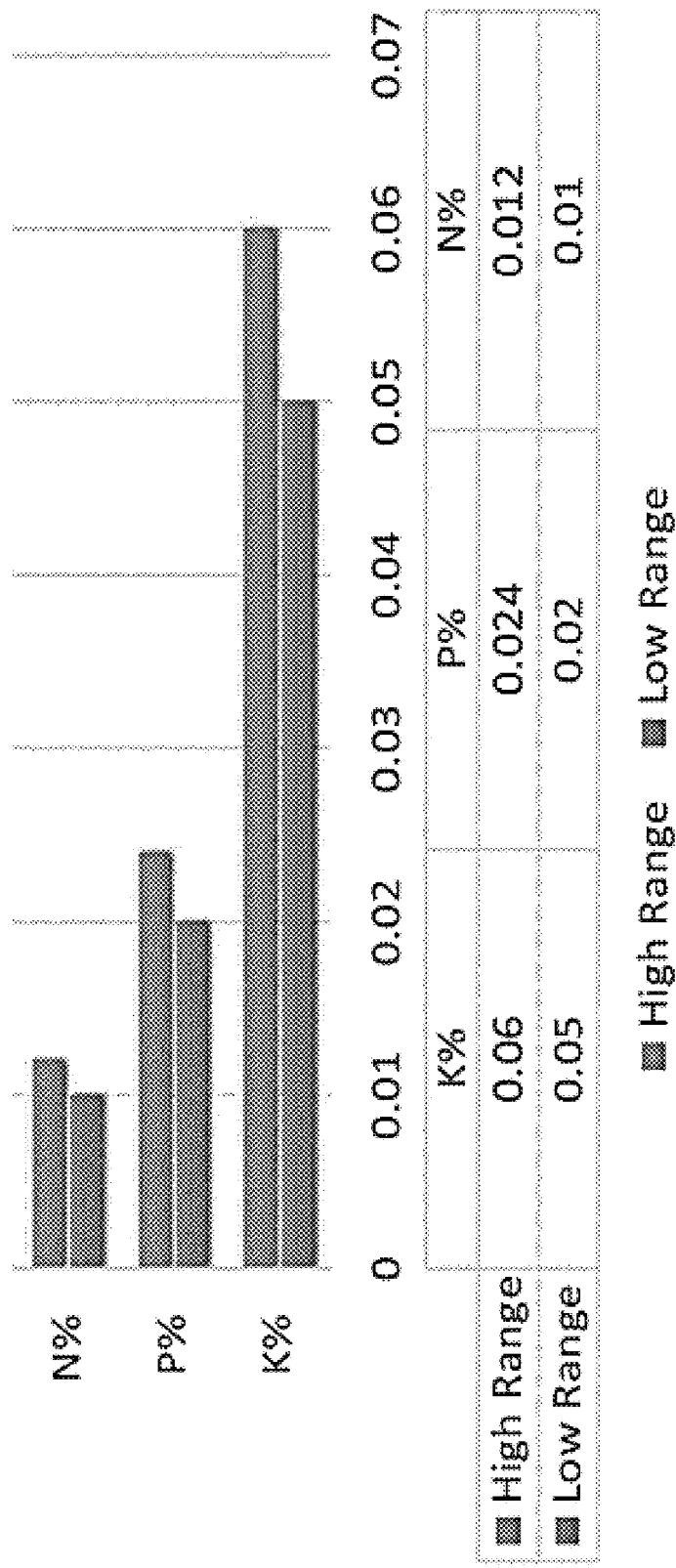
FIG. 2 is a diagram depicting steam distilled Tea Tree Oil lab results.

Oil derived from the *Melaleuca* (Tea Tree) leaves tested positive for N, P and K macronutrients. The *Melaleuca alternifolia* components specified by the international standard (ISO 4730; oil of *Melaleuca*, terpinen-4-ol type) were selected this analysis because of, for instance, provenance verification and known biological activity. TTO purchased commercially (high grade, ISO 4730) was analyzed using standard laboratory procedures. FIG. 2 represents steam distilled Tea Tree Oil lab results, showing the levels of Nitrogen, Phosphorus, and Potassium. It is noted, however, that the compositions provided herein do not rely on any particular process of oil extraction as a means of defining the derived fertilizer macronutrient components.

Figure 3:
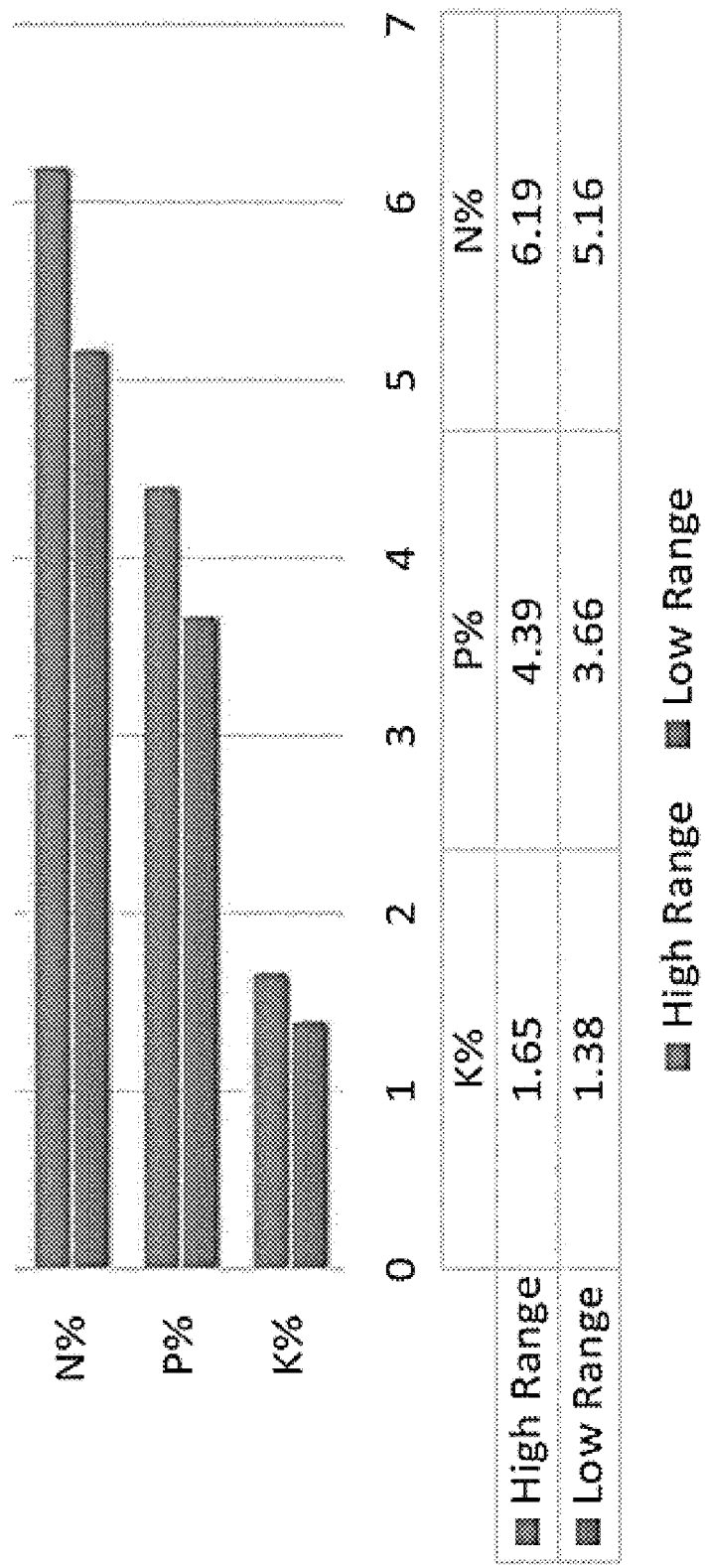
FIG. 3 is a diagram depicting NPK derived macronutrients measurements enhancing biological activity and associated plant uptake.

A representative sample of an embodiment of the compound invention improves NPK derived macronutrients measurements (FIG. 3) compared to purified TTO. The sample tested included Tea Tree (*Melaleuca alternifolia*) oil ISO 4730* (250 g/L), plant derived minerals, ionic sea minerals, and kelp extract; it was tested using the same procedures as above. It is believed that this higher level of NPK macronutrients provided by the herein described compositions enhances biological activity and associated plant uptake, which can then use the TTO NPK more effectively than if it was provided as a sole composition.

Example 2: Greenhouse and Field Trials

This example provides representative methods for comparing the greenhouse or field performance of plants grown with supplementation of herein described fertilizer embodiments versus commercially available fungicides, fertilizers, and/or other supplements.

Matched sets of plants, for instance agronomically important seedlings, are treated with standard amounts of a foliar fertilizer composition as described herein (the test specimens), no fertilizer (a control), and one or more alternative fertilizer regimens (the comparative specimens)—for instance, using a commercially available fertilizer or other plant adjuvant treatment. The different plant sets are kept under equivalent growth conditions for an equivalent period of time—for instance in a growth chamber, or in the field. At the end of the selected time period, plants from each of the different treatment conditions are evaluated for one or more agronomic traits—such as overall wet or dry weight, root weigh or development, leaf weight or development (e.g., number, span, etc.), fruit or seed production or set, time to harvest, resistance to insect predation or other biological stressor, resistance to abiotic stressor(s), and so forth. The results are compared in order to provide the level of improvement in growth and/or health characteristic(s) provided by the use of one of the herein-provided fertilizer composition.

This disclosure provides fertilizer compositions that include tea tree oil along with other components. The disclosure further provides methods of using such compositions, for instance to improve the growth, production, health, and/or longevity of plants to which they are applied. It will be apparent that the precise details of the methods described may be varied or modified without departing from the spirit of the described invention. We claim all such modifications and variations that fall within the scope and spirit of the claims below.

The invention claimed is:

1. A liquid composition for improving soil nutrients, wherein the composition comprises:
    10 to 30% of tea tree oil, wherein the tea tree oil contains one or more terpenes selected from the group consisting of terpinen-4-ol, γ-terpinene, and 1,8-cineole;
    10 to 20% of *Ascophyllum nodosum* preparation, which is a water soluble extract of *A. nodosum;*
    1 to 9% of an organic derived biostimulant selected from the group consisting of humic acid, fulvic acid, and a mixture thereof;
    30 to 50% of an organic derived mixture of macro minerals and trace minerals; and
    water to make up the remaining volume.

2. The liquid composition of claim 1, wherein the composition comprises:
    20 to 25% of the tea tree oil;
    10 to 15% of the *Ascophyllum nodosum* preparation;
    1 to 9% of the organic derived biostimulant;
    40 to 50% of the organic derived mixture of macro minerals and trace minerals; and
    water to make up the remaining volume.

3. A liquid composition for improving soil nutrients, wherein the composition comprises:
    25% of tea tree oil, wherein the tea tree oil contains one or more terpenes selected from the group consisting of terpinen-4-ol, γ-terpinene, and 1,8-cineole;
    13% of *Ascophyllum nodosum* preparation, which is a water soluble extract of *A. nodosum;*
    50% of an organic derived mixture of macro minerals and trace minerals;
    5% of humic acid; and
    water to make up the remaining volume.

* * * * *